United States Patent
Patterson et al.

(10) Patent No.: US 7,900,457 B2
(45) Date of Patent: Mar. 8, 2011

(54) METHOD AND APPARATUS TO FACILITATE REDUCING NO$_x$ EMISSIONS IN TURBINE ENGINES

(75) Inventors: David Bruce Patterson, Mason, OH (US); Art Johnson, Cincinnati, OH (US); John Howard Starkweather, Cincinnati, OH (US); Daniel Kirtley, Cincinnati, OH (US); Grzegorz Mlynski, Lomianki (PL)

(73) Assignee: General Electric Company, Schenectady, NY (US)

(*) Notice: Subject to any disclaimer, the term of this patent is extended or adjusted under 35 U.S.C. 154(b) by 648 days.

(21) Appl. No.: 11/590,178

(22) Filed: Oct. 31, 2006

(65) Prior Publication Data
US 2008/0010992 A1   Jan. 17, 2008

Related U.S. Application Data

(63) Continuation-in-part of application No. 11/486,757, filed on Jul. 14, 2006.

(51) Int. Cl.
F02C 1/00 (2006.01)
F02G 3/00 (2006.01)

(52) U.S. Cl. .......................................... 60/752
(58) Field of Classification Search ............... 60/752
See application file for complete search history.

(56) References Cited

U.S. PATENT DOCUMENTS

| | | | |
|---|---|---|---|
| 5,685,706 A | 11/1997 | Hersh et al. | |
| 6,048,510 A | 4/2000 | Zauderer | |
| 6,101,814 A * | 8/2000 | Hoke et al. | 60/752 |
| 6,260,359 B1 * | 7/2001 | Monty et al. | 60/752 |
| 6,415,745 B1 | 7/2002 | Hellen et al. | |
| 6,427,446 B1 * | 8/2002 | Kraft et al. | 60/737 |
| 6,453,830 B1 | 9/2002 | Zauderer | |
| 6,694,900 B2 | 2/2004 | Lissianski et al. | |
| 6,823,852 B2 | 11/2004 | Coltier, Jr. | |
| 6,865,881 B2 | 3/2005 | Monro, Jr. | |
| 6,953,558 B2 | 10/2005 | Monical | |
| 7,047,748 B2 | 5/2006 | Zauderer | |
| 7,082,753 B2 | 8/2006 | Dalla Betta et al. | |
| 7,086,232 B2 * | 8/2006 | Moertle et al. | 60/752 |
| 7,146,802 B2 | 12/2006 | Lee | |
| 2003/0200752 A1 * | 10/2003 | Moertle et al. | 60/746 |

OTHER PUBLICATIONS

An English language translation of a Chinese First Office, dated Mar. 25, 2010, from the State Intellectual Property Office, P.R. China, for co-pending Chinese patent application No. 200710136478.7 (17 pages).

* cited by examiner

*Primary Examiner* — Michael Cuff
*Assistant Examiner* — Craig Kim
(74) *Attorney, Agent, or Firm* — William Scott Andes, Esq.; Armstrong Teasdale LLP (57) ABSTRACT

A method for fabricating a combustor liner for a gas turbine engine is provided. The method includes providing an annular shell including a plurality of circumferentially extending panels, wherein the plurality of circumferentially extending panels includes a first panel positioned at an upstream end of the shell and a second panel positioned downstream from, and adjacent to, the first panel. The method also includes forming a plurality of primary dilution holes in the first panel and forming a plurality of secondary dilution holes in the second panel, wherein the primary and secondary dilution holes are configured to discharge dilution air into the shell.

20 Claims, 6 Drawing Sheets

METHOD AND APPARATUS TO FACILITATE REDUCING $NO_x$ EMISSIONS IN TURBINE ENGINES

CROSS REFERENCE TO RELATED APPLICATIONS

This application is a Continuation-in-Part Application of U.S. patent application Ser. No. 11/486,757 filed Jul. 14, 2006.

BACKGROUND OF THE INVENTION

This invention relates generally to gas turbines, and more particularly, to methods and systems that facilitate reducing $NO_x$ (generic for any nitrogen oxide combination) emissions from turbine engines.

At least some known combustors used with gas turbine engines produce $NO_x$ emissions as a by-product of the combustion process. Generally, the cause of $NO_x$ emissions may be two-fold. First, higher combustion temperatures generated within the combustor facilitate the production and output of $NO_x$ emissions. Second, an increased residence time, or time required for fuel and air to mix within the combustor also facilitates increased $NO_x$ emissions.

To facilitate reducing combustor temperatures and residence times, at least some known combustors include dilution holes formed in the combustor liner. Specifically, the dilution holes are positioned to discharge dilution air into the combustion chamber to facilitate increasing the rate of mixing of fuel and air within the combustor. Moreover, the dilution air facilitates reducing the combustion temperature while maintaining desired combustion levels.

Generally, because of the positioning and/or orientation of dilution holes within the combustor liner, at least some known combustors which satisfy current emissions standards, as specified by the International Civil Aviation Organization (ICAO) Committee on Aviation Environmental Protection (CAEP), may not meet more stringent standards. For example, at least some known engines that are capable of meeting current CAEP standards (that are effective as of Dec. 31, 2003), may not satisfy future CAEP standards that come into effect after Dec. 31, 2007. Specifically, at least some known engines include dilution holes positioned only at a downstream end of the combustor. However, within such combustors, dilution air may not reduce residence times and/or combustion operating temperatures near a forward end of the combustion chamber, where $NO_x$ emissions may be generated.

BRIEF DESCRIPTION OF THE INVENTION

In one aspect, a method for fabricating a combustor liner for a gas turbine engine is provided. The method includes providing an annular shell including a plurality of circumferentially extending panels, wherein the plurality of circumferentially extending panels includes a first panel positioned at an upstream end of the shell and a second panel positioned downstream from, and adjacent to, the first panel. The method also includes forming a plurality of primary dilution holes in the first panel, forming a plurality of secondary dilution holes in the second panel, wherein the primary and secondary dilution holes are configured to discharge dilution air into the shell, and forming at least one group of cooling holes downstream of the plurality of secondary dilution holes.

In another aspect, a combustor liner is provided. The combustor liner includes an annular shell including a plurality of circumferentially-extending panels, wherein the plurality of circumferentially-extending panels includes a first panel positioned at an upstream end of the shell and a second panel positioned downstream from, and adjacent to, the first panel. The combustor liner also includes a plurality of primary dilution holes formed in the first panel, a plurality of secondary dilution holes formed in the second panel, the primary and secondary dilution holes configured to channel dilution air into the shell, and at least one group of cooling holes downstream of the plurality of secondary dilution holes. In a further aspect, a gas turbine engine is provided. The gas turbine engine includes a compressor and a combustor including a combustor liner. The combustor liner includes an annular shell including a plurality of circumferentially-extending panels, wherein the plurality of circumferentially-extending panels includes a first panel positioned at an upstream end of the shell and a second panel positioned downstream from, and adjacent to, the first panel. The combustor liner also includes a plurality of primary dilution holes formed in the first panel, and a plurality of secondary dilution holes formed in the second panel, and at least one group of cooling holes formed in the panel downstream of the plurality of secondary dilution holes. The primary and secondary dilution holes are configured to channel dilution air from the compressor into the combustor.

DETAILED DESCRIPTION OF THE INVENTION

Figure 1:
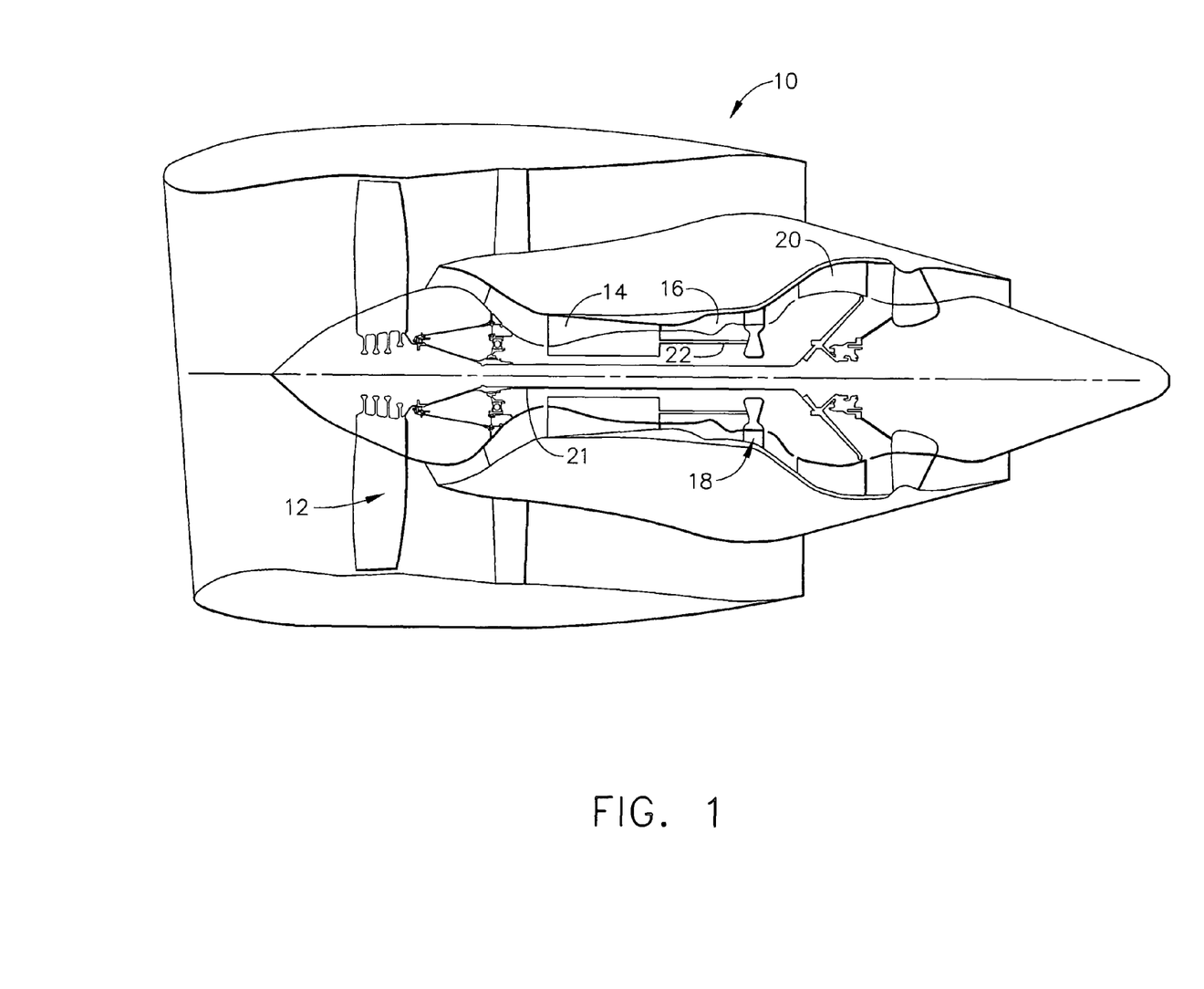
FIG. 1 is a schematic illustration of an exemplary turbine engine.

FIG. 1 is a schematic illustration of an exemplary gas turbine engine 10. Engine 10 includes a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 21, and compressor 14 and turbine 18 are coupled by a second shaft 22. In the exemplary embodiment, gas turbine engine 10 is a CFM56 gas turbine engine or CF34-10 that are available from General Electric Company, Cincinnati, Ohio.

Figure 2:
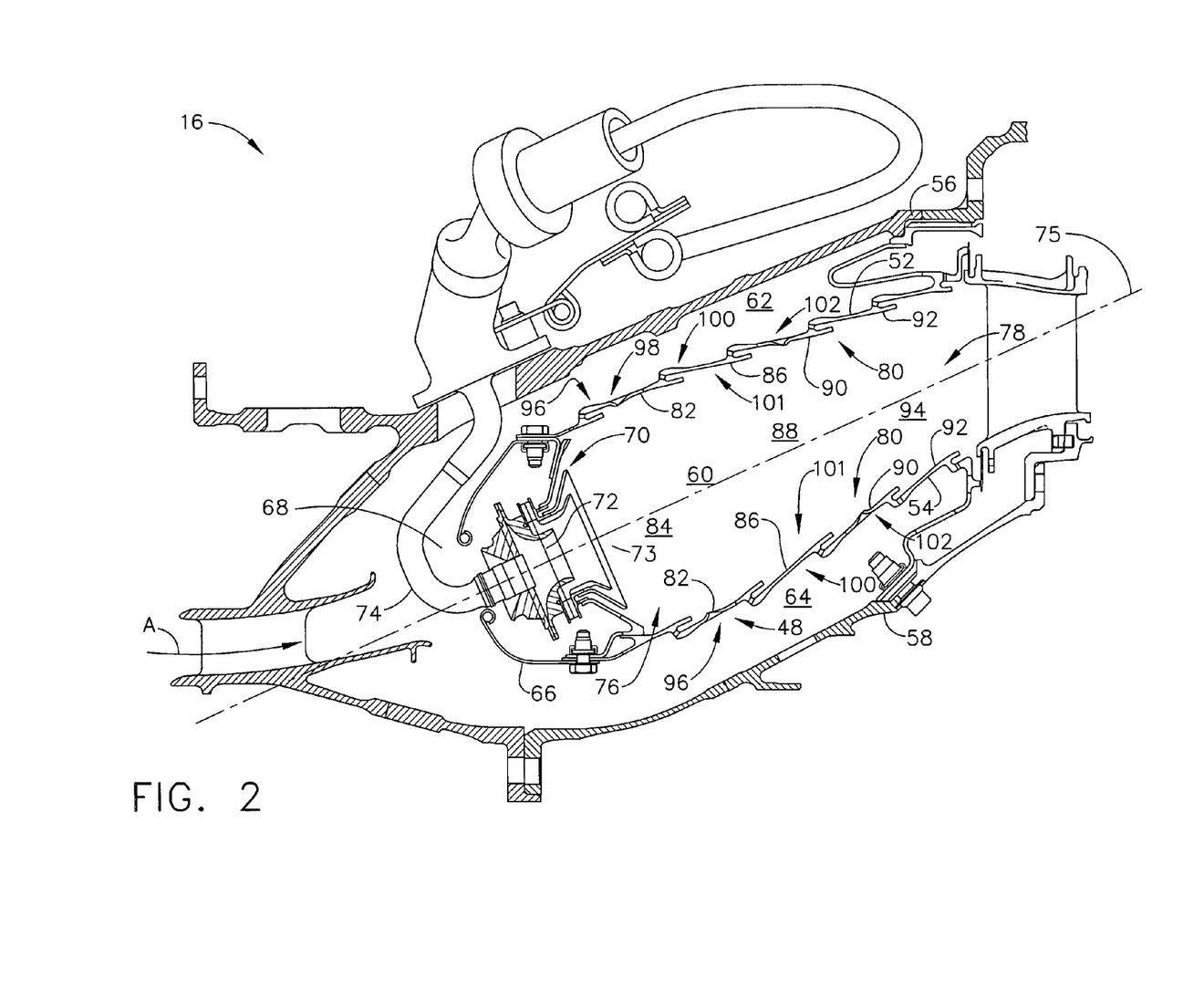
FIG. 2 is a schematic cross-sectional view of an exemplary combustor that may be used with the turbine engine shown in FIG. 1.

FIG. 2 is a schematic cross-sectional view of an exemplary combustor 16 that may be used with gas turbine engine 10 (shown in FIG. 1). Combustor 16 includes an outer liner 52 and an inner liner 54 disposed between an outer combustor casing 56 and an inner combustor casing 58. Outer and inner liners 52 and 54 are spaced radially from each other such that a combustion chamber 60 is defined therebetween. Outer liner 52 and outer casing 56 form an outer passage 62 therebetween, and inner liner 54 and inner casing 58 form an inner passage 64 therebetween. A cowl assembly 66 is coupled to the upstream ends of outer and inner liners 52 and 54, respectively. An annular opening 68 formed in cowl assembly 66 enables compressed air entering combustor 16 through a diffuse opening in a direction generally indicated by arrow A. The compressed air flows through annular opening 68 to support combustion and to facilitate cooling liners 52 and 54.

An annular dome plate 70 extends between, and is coupled to, outer and inner liners 52 and 54 near their upstream ends. A plurality of circumferentially spaced swirler assemblies 72 are coupled to dome plate 70. Each swirler assembly 72 receives compressed air from opening 68 and fuel from a corresponding fuel injector 74. Fuel and air are swirled and mixed together by swirler assemblies 72, and the resulting fuel/air mixture is discharged into combustion chamber 60. Combustor 16 includes a longitudinal axis 75 which extends from a forward end 76 to an aft end 78 of combustor 16. In the exemplary embodiment, combustor 16 is a single annular combustor. Alternatively, combustor 16 may be any other combustor, including, but not limited to a double annular combustor.

In the exemplary embodiment, outer and inner liners 52 and 54 each include a plurality of overlapped panels 80. More specifically, in the exemplary embodiment, outer liner 52 includes five panels 80 and inner liner 54 includes four panels 80. In an alternative embodiment, both outer and inner liner 52 and 54 may each include any number of panels 80. Panels 80 define combustion chamber 60 within combustor 16. Specifically, in the exemplary embodiment, a pair of first panels 82, positioned upstream, define a primary combustion zone 84, a pair of second panels 86, positioned downstream from first panels 82, define an intermediate combustion zone 88, and a pair of third panels 90, positioned downstream from second panels 86, and a pair of fourth panels 92, positioned downstream from third panels 90, define a downstream dilution combustion zone 94.

Dilution air is introduced primarily into combustor chamber 60 through a plurality of circumferentially spaced dilution holes 96 that extend through each of outer and inner liners 52 and 54. In the exemplary embodiment, dilution holes 96 are each substantially circular. In an alternative embodiment, dilution holes 96 may have any shape that facilitates reducing $NO_x$ emissions, as described herein. In the exemplary embodiment, dilution holes 96 are arranged in circumferentially-extending rows defined about the periphery of liners 52 and 54. In a forward-most row 98 of dilution holes 96, dilution holes 96 are referred to as primary dilution holes 106. In the exemplary embodiment, primary dilution holes 106 defined within first panel 82 are oriented to discharge dilution air into primary combustion zone 84. Also in the exemplary embodiment, a second row 100 includes a plurality of dilution holes 96, where the dilution holes 96 are referred to as secondary dilution holes 108. The second row 100 of secondary dilution holes 108 is formed in a downstream end 101 of second panel 86 and is oriented to discharge dilution air into intermediate combustion zone 88.

When combustor 16 is fully assembled, each primary dilution hole 106 is substantially aligned with each circumferentially-spaced injection point 73, as defined by a center of each fuel injector 74 and swirler 72. During operation, the flow of combustion gases past the injection points 73 may create "hot streaks" of locally increased material temperatures. Because of the swirl of the flow in the combustor caused by the swirlers 72, such streaks are not strictly longitudinal; but rather the streaks are generally curved in the circumferential direction when viewed along the length of the combustor 16. The orientation of the dilution holes 96, and in particular, because at least one primary dilution hole 106 is substantially aligned with each injection point, facilitates reducing hot streaks and, more particularly, $NO_x$ emissions within combustor 16. Moreover, the placement of secondary dilution holes 108 relative to primary dilution holes 106 also facilitates reducing $NO_x$ emissions. Specifically, primary dilution holes 106 and secondary dilution holes 108 facilitate rapid mixing of fuel and air such that combustion residence time is reduced and, as such, combustion temperatures throughout combustor 16 are also reduced. As such, $NO_x$ emissions, smoke, and combustor exit temperatures are also facilitated to be reduced. Specifically, primary dilution holes 106 and secondary dilution holes 108 may reduce $NO_x$ emissions by as much as 20-25%. Moreover, primary dilution holes 106 and secondary dilution holes 108 facilitate operating the combustor with a substantially linear temperature change in response to increased combustion, such that $NO_x$ emissions are further reduced, while a life-span of the turbine engine is facilitated to be increased.

Figure 3:
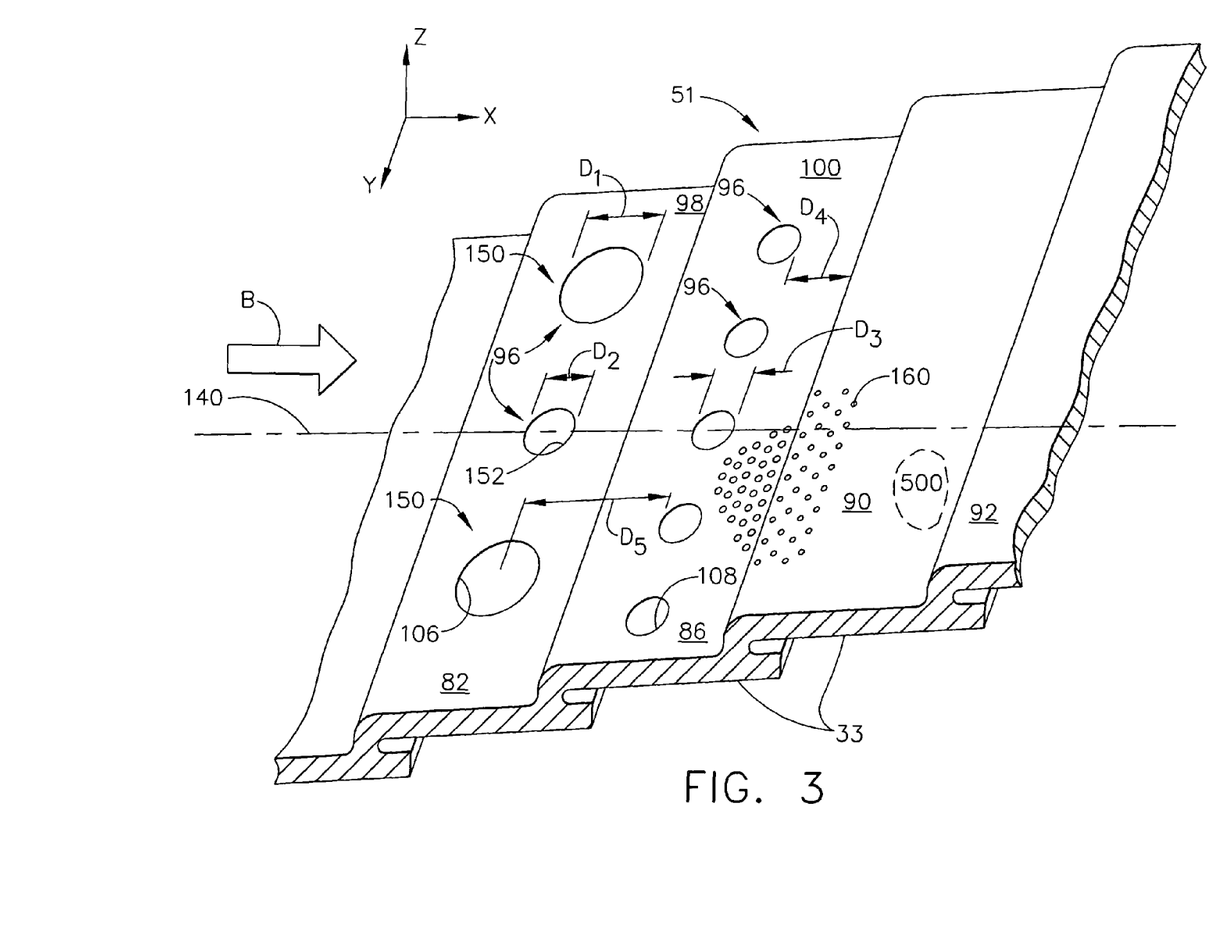
FIG. 3 is an enlarged perspective view of an exemplary combustor liner that may be used with the combustor shown in FIG. 2.

FIG. 3 illustrates an exemplary combustor liner 51 that may be used with combustor 16. Specifically, in FIG. 3, the dilution holes 96 are illustrated as being defined within an outer liner 51. Outer liner 51 is substantially similar to outer liner 52 (shown in FIG. 2), and components of outer liner 51 that are identical to components of outer liner 52 are identified in FIG. 3 using the same reference numerals used in FIG. 2. Because the outer liner illustrated in FIG. 3 is new, compared with outer liner 52, it is identified using a new reference number 51. However, it should be noted that although FIG. 3 depicts primary dilution holes 106 and secondary dilution holes 108 in outer liner 51, it should be understood that the configuration of primary dilution holes 106 and secondary dilution holes 108 of the inner liner (not shown) may be substantially similar to that of outer liner 51. As such, the following description will also apply to inner liner 54. FIG. 3 also includes a frame of reference having axes labeled X, Y and Z, wherein X represents an axial distance extending downstream along the longitudinal axis 140 of combustor 16, Y represents the circumferential direction, and Z represents a radial direction. As previously discussed, in the exemplary embodiment, dilution holes 96 are arranged in a pattern of circumferentially extending rows. More specifically, in the exemplary embodiment, a forward-most row 98 of primary dilution holes 106 is formed within first panel 82, and a second row 100 of secondary dilution holes 108 is formed within second panel 86. Moreover, in the exemplary embodiment, at least one dilution hole 96 within row 98 of primary dilution holes 106, and at least one dilution hole 96 within second row 100 of secondary dilution holes 108 is substantially aligned with a longitudinal axis 140 of each swirler 72.

In the exemplary embodiment, primary dilution holes 106 include a first group 150 of primary dilution holes 106 and a second group 152 of primary dilution holes 106. In the exemplary embodiment, each primary dilution hole 106 within the first group 150 has a diameter $D_1$ that is longer than a diameter $D_2$ of each primary dilution hole 106 within the second group 152. Moreover, in the exemplary embodiment, each primary dilution hole 106 within the first group 150 is located between a pair of adjacent primary dilution holes 106 within the second group 152. In addition, in the exemplary embodiment, secondary dilution holes 108 include a plurality of substantially evenly-spaced secondary dilution holes 108 that each have a diameter $D_3$ that is shorter than both diameters $D_1$ and $D_2$.

In the exemplary embodiment, secondary dilution holes 108 are spaced a distance $D_4$ from third panel 90 and a distance $D_5$ from primary dilution holes 106. In the exemplary embodiment, distance $D_4$ is approximately one-half diameter $D_3$, and distance $D_5$ is approximately two to four times diameter $D_3$. In the exemplary embodiment, diameter $D_1$ is approximately 0.398±0.005 inches, diameter $D_2$ is approximately 0.312±0.005 inches, and diameter $D_3$ is approximately 0.297±0.005 inches. In an alternative embodiment, each dilution hole 96 is formed with any suitable size that facilitates reducing $NO_x$ emissions as described herein. In addition, in an alternative embodiment, each dilution hole 96 is formed in any suitable location or orientation that facilitates achieving reduced $NO_x$ emissions as described herein.

Liner 51 also includes a plurality of cooling holes 160 formed in both second panel 86 and third panel 90 that facilitate cooling liner 51. In the exemplary embodiment, second panel 86 includes a group of twenty cooling holes 160 that are located between adjacent dilution holes 96, and third panel 90 includes a group of thirty-four cooling holes 160. Although, only one group of cooling holes 160 is illustrated in each of second panel 86 and third panel 90, it should be understood that the groups of cooling holes 160 are spaced circumferentially about second panel 86 and third panel 90. it should be appreciated that each group of cooling holes 160 is positioned upstream of each corresponding hot spot 500 to facilitate channeling cooling fluid onto each corresponding hot spot 500. As such, in the exemplary embodiment, second panel 86 includes a total of approximately four hundred cooling holes 160 defined between adjacent secondary dilution holes 108, and third panel 90 includes a total of approximately six hundred eighty cooling holes 160 spaced circumferentially about fourth panel 92. Alternatively, second panel 86 and third panel 90 include any number of cooling holes 160 that facilitates cooling of liner 51. Further, in the exemplary embodiment cooling holes 160 have a diameter $D_6$ that is approximately 0.025 inches. In an alternative embodiment, diameter $D_6$ is any length that facilitates cooling of liner 51 as described herein. Moreover, it should be appreciated that although cooling holes 160 are described as having a diameter of 0.025 inches in the exemplary embodiment, other embodiments may use different diameters for each of cooling holes 160 or may use the same diameter for each of the cooling holes 160 that enables cooling holes 160 to function as described herein.

During operation of gas turbine engine 10, an inner surface 33 of liner 51 becomes hot and requires cooling. Consequently, in the exemplary embodiment, cooling holes 160 are positioned in liner 51 to facilitate channeling cooling fluid onto hot spots 500 of liner 51. More specifically, cooling holes 160 channel cooling fluid from outer passage 62 to the combustion chamber 60, thus providing a layer of cooling fluid to inner surface 33. It should be appreciated that other embodiments may use any configuration of cooling holes 160 that enables cooling holes 160 to function as described herein.

Figure 4:
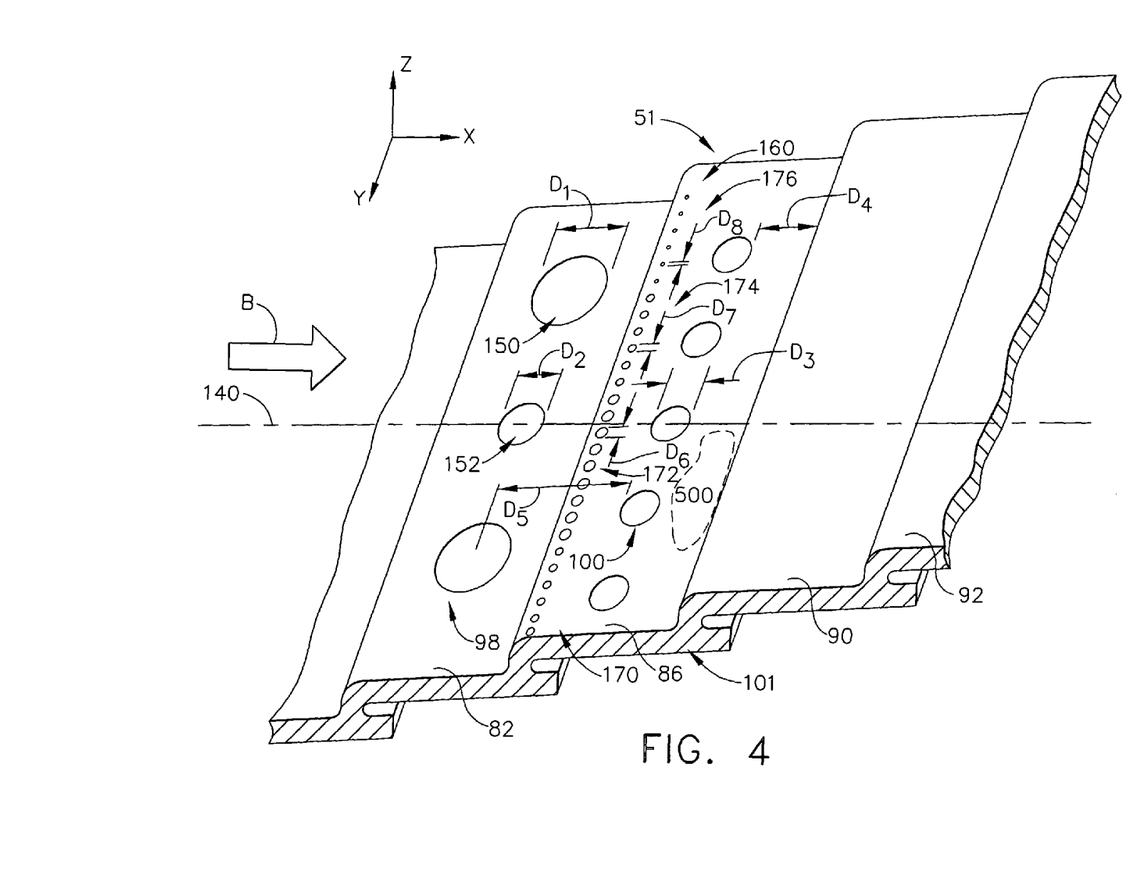
FIG. 4 is an enlarged perspective view of an alternative embodiment of a combustor liner that may be used with the combustor shown in FIG. 2.

FIG. 4 illustrates an alternative embodiment of an outer liner 51 that may be used with combustor 16 (shown in FIG. 2). Specifically, in FIG. 4, cooling holes 160 are positioned along an upstream edge 170 of second panel 86. Although FIG. 4 depicts cooling holes 160 in outer liner 51, it should be understood that the configuration of cooling holes 160 of the inner liner (not shown) may be substantially identical to that of outer liner 51. As such, the following description will also apply to the inner liner. In the exemplary embodiment, cooling holes 160 are arranged in three groups. Specifically, each cooling hole 160 of a first group 172 has a diameter $D_6$, each cooling hole 160 of a second group 174 has a diameter $D_7$, and each cooling hole 160 of a third group 176 has a diameter $D_8$. Diameter $D_7$ is longer than diameter $D_8$, and diameter $D_6$ is longer than both diameters $D_7$ and $D_8$. In the exemplary embodiment, second panel 86 includes a plurality of each first group 172, second group 174, and third group 176. In the exemplary embodiment, each first group 172 is positioned along an upstream edge 170 of second panel 86 at any relative location of second panel 86 that may be subjected to, or experience hot spots 500 during engine operations, and each third group 176 is positioned along upstream edge 170 at any location of second panel 86 that has a relatively lower temperature in comparison to locations including group 172. In addition, each second group 174 is positioned along upstream edge 170 at any relative location of second panel 86 that has a relatively intermediate temperature in comparison to locations including groups 172 and group 176. It should be appreciated that groups 172, 174 and 176 are described in the exemplary embodiment as including groups of uniformly sized cooling holes 160, other embodiments may use groups 172, 174 and 176 of cooling holes 160 that are not uniformly sized and that enables groups 172, 174 and 176 of cooling holes 160 to function as described herein. Moreover, it should be appreciated that although the exemplary embodiment describes three cooling holes diameters $D_6$, $D_7$ and $D_8$, other embodiments may use any number of cooling hole diameters that enable groups 172, 174 and 176 of cooling holes 160 to function as described herein.

In the exemplary embodiment, each first group 172 is positioned upstream of each corresponding hot spot 500 to facilitate channeling cooling fluid from outer passage 62 to combustion chamber 60 and onto each corresponding hot spot 500. Each third group 176 is positioned to facilitate channeling cooling fluid onto areas of cooler temperature, relative to hot spots 500. Because areas of cooler temperature require less cooling fluid, each third group 176 channels less cooling fluid than each first group 172. Each second group 174 is positioned to facilitate channeling cooling fluid onto areas of relatively intermediate temperature. Consequently, each second group 174 facilitates channeling an amount of cooling fluid between that channeled by first group 172 and third group 176. Thus, in the exemplary embodiment, groups 172, 174 and 176 may be positioned to channel more cooling fluid to hotter regions of liner 51, channel an intermediate amount of cooling fluid to intermediate temperature regions of liner 51, and channel a least amount of cooling fluid to cooler areas of liner 51.

Figure 5:
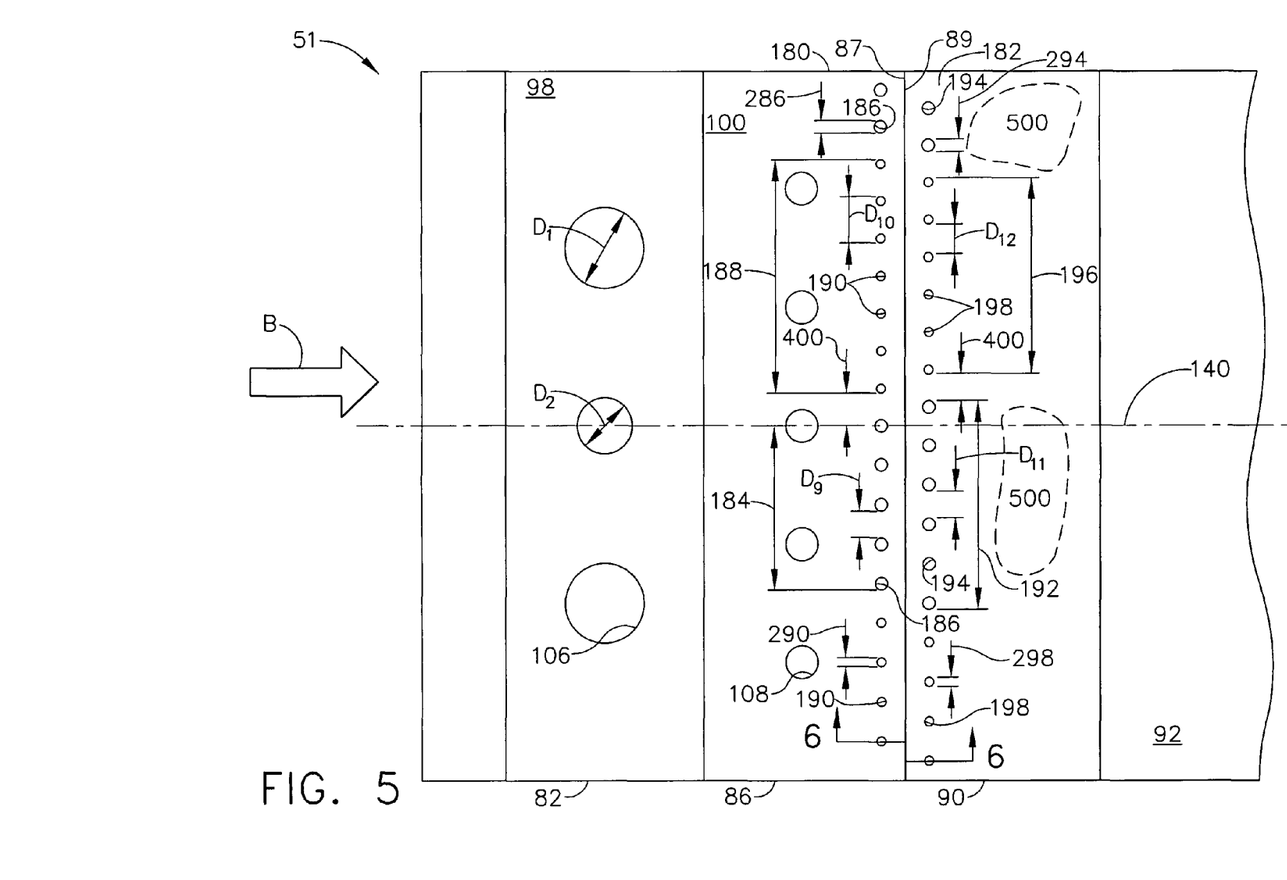
FIG. 5 is an enlarged plan view of another alternative embodiment of a combustor liner that may be used with the combustor shown in FIG. 2.

FIG. 5 illustrates another alternative exemplary combustor liner 51 that may be used with combustor 16 (shown in FIG. 2). Specifically, FIG. 5 shows a first cooling hole band 180 and a second cooling hole band 182 positioned at the intersection of panels 86 and 90, and downstream from secondary dilution holes 108. Although FIG. 5 depicts cooling hole bands 180 and 182 in outer liner 51, it should be understood that the configuration of cooling hole bands 180 and 182 of the inner liner (not shown) may be substantially identical to those of outer liner 51. As such, the following description will also apply to the inner liner.

Cooling hole band 180 includes at least one group 184 of larger diameter cooling holes 186 and at least one group 188 of smaller diameter cooling holes 190. The larger diameter cooling holes 186 of group 184 are separated by a distance Do that is approximately equal to twice the inside diameter 286 of holes 186. The smaller diameter cooling holes 190 of group 188 are separated by a distance $D_{10}$ that is approximately equal to twice the inside diameter 290 of holes 190. Likewise, cooling hole band 182 includes at least one group 192 of larger diameter cooling holes 194 and at least one group 196 of smaller diameter cooling holes 198. The larger diameter cooling holes 194 of group 192 are separated by a distance $D_{11}$ that is approximately equal to twice the inside diameter 294 of holes 194. The smaller diameter cooling holes 198 of group 196 are separated by a distance $D_{12}$ that is approximately equal to twice the inside diameter 298 of holes 198. In transition areas defined between the different groups of cooling holes, i.e., groups 184 and 188, and groups 192 and 196, a distance 400 between groups 184 and 188, and 192 and 196, may be twice the inside diameter 286 and 290 of holes 186 and 190, or twice the inside diameter 294 and 298 of holes 194 and 198, respectively. Generally, inside diameters 290 and 298 of holes 190 and 198, respectively, are the same. Likewise, inside diameters 286 and 294 of holes 186 and 194, respectively, are generally the same. However, it should be appreciated that in other embodiments, holes 190 and 198 may have different diameters 290 and 298, respectively, and/or holes 186 and 194 may have different diameters, 286 and 294, respectively.

Cooling hole band 180 is positioned along a downstream edge 87 of panel 86 and cooling hole band 182 is positioned along an upstream edge 89 of panel 90, such that holes 186 and holes 190 of band 180 are staggered or offset, from respective holes 194 and 198 of band 182. It should be appreciated that although this alternative embodiment orients the larger diameter cooling holes 186 and the smaller diameter cooling holes 190 to be offset from respective larger diameter cooling holes 194 and smaller diameter cooling holes 198, in other embodiments, holes 186 and 190 may be oriented in any manner that enables holes 186, 190, 194, and 198 to function as described herein.

Dilution holes 106 and 108 facilitate reducing $NO_x$ emissions. However, by changing linear dilution patterns on panels 82, 86, 90 and 92, dilution holes 106 and 108 also redistribute heat on panels 82, 86, 90 and 92, thus facilitating reducing or eliminating hot spot 500 development on panels 90 and 92 that are downstream from secondary dilution holes 108. In this alternative embodiment, cooling hole bands 180 and 182 are positioned such that cooling fluid is directed on panels 90 and 92 downstream of secondary dilution holes 108. It should be appreciated that although this alternative embodiment uses cooling hole bands 180 and 182 positioned about the intersection of panels 86 and 90, other embodiments may locate cooling hole bands 180 and 182 at any other panel location that enables the holes 186, 190, 194 and 198 to function as described herein.

Hot spots 500 generally require enhanced local cooling. Consequently, in the exemplary embodiment, a group 184 of large diameter cooling holes 186 and a group 192 of large diameter cooling holes 194 are each positioned upstream of each corresponding hot spot 500, facilitate channeling cooling fluid onto each corresponding hot spot 500. It should be appreciated that hot spot 500 locations may vary between engines and the location of groups 184 and 192 will vary accordingly. A group 188 of small diameter cooling holes 190 and a group 196 of small diameter cooling holes 198 are each positioned between groups 184 of large diameter cooling holes and groups 192 of large diameter cooling holes 194, respectively. Moreover, the locations of groups 188 and 196 correspond to panel areas that are downstream of secondary dilution holes 108 and areas that have a relatively lower temperature in comparison to hot spots 500. Thus, in the exemplary embodiment, groups 184, 188, 192 and 196 may be positioned to provide cooling fluid to the hottest regions of liner 51 while minimizing the cooling fluid provided to cooler regions of liner 51, thereby minimizing the impact to $NO_x$.

Figure 6:
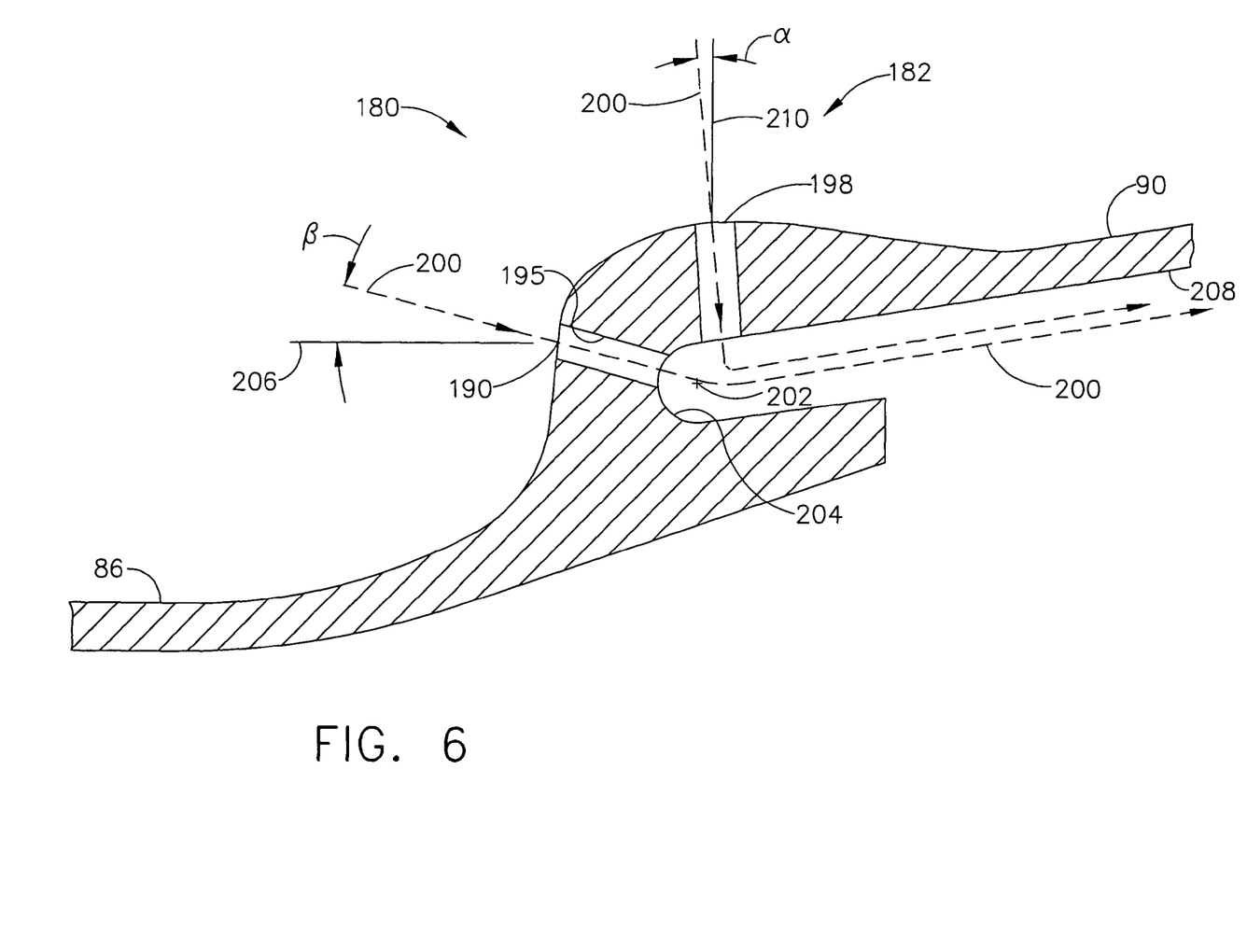
FIG. 6 is a cross-sectional view of the combustor liner shown in FIG. 5 and taken along line 6-6.

FIG. 6 is a cross-sectional view of combustor liner intersection between panels 86 and 90, shown in FIG. 5, taken along line 6-6, including exemplary small diameter cooling holes 190 and 198. It should be appreciated that although a section taken through holes 190 and 198 is shown in FIG. 6, a section taken through holes 186 and 194 would be identical except holes 186 and 194 would replace holes 190 and 198, respectively. The direction of cooling fluid flow is indicated by dashed lines 200. Small diameter cooling holes 190 of first cooling hole band 180 are aligned to channel fluid flow into a passage 195 defined between panels 86 and 90. Small diameter cooling holes 198 of second cooling hole band 182 are oriented substantially perpendicularly with respect to a radially inner surface 208 of panel 90. It should be appreciated that holes 190 and 198, or 186 and 194, may be oriented at any angle that enables small diameter cooling holes 190 and 198 to function as described herein. In the exemplary embodiment, holes 186, 190, 194 and 198 may have a diameter that ranges from a minimum of 0.02 inches to a maximum of 0.03 inches. It should be appreciated that although the exemplary embodiment uses radially aligned holes 190 and perpendicularly-oriented holes 198, other embodiments may orient small diameter cooling holes 190 and 198 in any alignment, including non-radially and non-perpendicularly, that enables holes 190 and 198 to function as described herein.

It should be appreciated that although the exemplary embodiment describes cooling hole groups 184, 188, 192 and 196 as including uniformly sized cooling holes 186, 190, 194 and 198, respectively, other embodiments may use cooling hole groups 184, 188, 192 and 196 that include non-uniformly sized cooling holes 186, 190, 194 and 198, respectively, that enable groups 184, 188, 192 and 196 to function as described herein. For example, cooling holes 186 may not be uniformly sized and may not have diameters equal to cooling holes 190, 194 and 198. Likewise, cooling holes 190 may not be uniformly sized and may not have diameters equal to cooling holes 186, 194 and 198. Similarly, cooling holes 194 may not be uniformly sized and may not have diameters equal to cooling holes 186, 190 and 198. By the same token, cooling holes 198 may not be uniformly sized and may not have diameters equal to cooling holes 186, 190 and 194. Moreover, it should be appreciated that in other embodiments, groups 184, 188, 192 and 196 may include any combination of cooling holes 186, 190, 194 and 198 of any size and of any number that enables cooling hole groups 184, 188, 192 and 196 to function as described herein.

The above-described primary dilution holes and secondary dilution holes facilitate reducing a residence time of combustion and reducing a lower combustion temperature throughout the combustor. As such, $NO_1$ emissions, smoke, and combustor exit temperatures generated within the combustor are facilitated to be reduced. Furthermore, location and orientation of the dilution holes facilitates operation of the combustor with a substantially linear temperature change in response to increased combustion. The linear temperature change of the combustor facilitates reducing $NO_x$ emissions and increasing a life-span of the turbine engine. Specifically, the above-described dilution holes may reduce $NO_x$ emissions by as much as 20-25%, such that the above-described methods and apparatus facilitate engine operation within specified CAEP requirements. Moreover, the cooling bands facilitate enhanced cooling at hotter regions of the liners and decreased cooling fluids at cooler regions of the liners, thereby minimizing the overall cooling requirements and maximizing the $NO_x$ reduction benefit.

Although the apparatus and methods described herein are described in the context of positioning dilution holes in a combustor liner of a gas turbine engine, it is understood that the apparatus and methods are not limited to gas turbine engines, combustor liners, or dilution holes. Likewise, the gas turbine engine and combustor liner components illustrated are not limited to the specific embodiments described herein, but rather, components of both the gas turbine engine and the combustor liner can be utilized independently and separately from other components described herein.

While the invention has been described in terms of various specific embodiments, those skilled in the art will recognize that the invention can be practiced with modification within the spirit and scope of the claims.

What is claimed is:

1. A method for fabricating a combustor liner for a gas turbine engine, said method comprising:
providing an annular shell including a plurality of circumferentially extending panels that overlap adjacent ones of the plurality of panels in an axial direction, wherein the plurality of circumferentially extending panels includes a first panel positioned at an upstream end of the shell and a second panel positioned downstream from, and adjacent to, the first panel;
forming a plurality of primary dilution holes in the first panel;
forming a plurality of secondary dilution holes in the second panel, wherein the plurality of primary dilution holes and the plurality of secondary dilution holes are configured to discharge dilution air into the shell; and
forming a plurality of circumferentially aligned cooling holes in at least one of the first panel and the second panel, wherein the plurality of circumferentially aligned cooling holes includes a first group of cooling holes having a first size, a second group of cooling holes having a second size different than the first size, and a third group of cooling holes having a third size different than the first size and the second size.

2. A method in accordance with claim 1 further comprising positioning the plurality of secondary dilution holes a distance from the plurality of primary dilution holes, wherein the distance is within a range of twice a diameter of the plurality of secondary dilution holes to four times the diameter of the plurality of secondary dilution holes.

3. A method in accordance with claim 1 further comprising:
defining a first group of the plurality of primary dilution holes and a second group of the plurality of primary dilution holes, wherein each dilution hole of the first group of the plurality of primary dilution holes has a diameter that is larger than a diameter of each dilution hole of the second group of the plurality of primary dilution holes, and wherein each dilution hole of the first group of the plurality of primary dilution holes is between adjacent dilution holes of the second group of the plurality of primary dilution holes; and
positioning the plurality of circumferentially aligned cooling holes upstream of a hot spot.

4. A method in accordance with claim 1 wherein forming a plurality of primary dilution holes further comprises forming the plurality of primary dilution holes with a diameter that is larger than a diameter of the plurality of secondary dilution holes.

5. A method in accordance with claim 1 wherein forming a plurality of secondary dilution holes further comprises positioning the plurality of secondary dilution holes a distance from a third panel that extends downstream from the second panel, wherein the distance is approximately one half a diameter of the plurality of secondary dilution holes.

6. A method in accordance with claim 1 wherein forming a plurality of secondary dilution holes further comprises aligning at least one dilution hole of the plurality of secondary dilution holes with a swirler configured to discharge a fuel/air mixture into the shell.

7. A method in accordance with claim 1 further comprising orienting the plurality of primary dilution holes and the plurality of secondary dilution holes to facilitate reducing $NO_x$ emissions in the gas turbine engine.

8. A combustor liner comprising:
an annular shell comprising a plurality of overlapping circumferentially-extending panels, wherein said plurality of circumferentially-extending panels comprises a first panel positioned at an upstream end of said shell and a second panel positioned downstream from, and adjacent to, said first panel, a downstream portion of the first panel overlaps an upstream portion of the second panel;
a plurality of primary dilution holes formed in said first panel;
a plurality of secondary dilution holes formed in said second panel, said plurality of primary dilution holes and said plurality of secondary dilution holes configured to channel dilution air into said shell; and
a plurality of circumferentially aligned cooling holes formed in at least one of said first panel and said second panel, wherein said plurality of circumferentially aligned cooling holes comprises a first group of cooling holes having a first size, a second group of cooling holes having a second size different than the first size, and a third group of cooling holes having a third size different than the first size and the second size.

9. A combustor liner in accordance with claim 8 wherein said plurality of secondary dilution holes is positioned a distance from said plurality of primary dilution holes, the distance within a range of twice a diameter of said plurality of secondary dilution holes to four times the diameter of said plurality of secondary dilution holes.

10. A combustor liner in accordance with claim 8 wherein said plurality of primary dilution holes comprises a first group of said plurality of primary dilution holes and a second group of said plurality of primary dilution holes, each dilution hole of said first group of said plurality of primary dilution holes has a diameter that is larger than a diameter of each dilution hole of said second group of said plurality of primary dilution holes, each dilution hole of said first group of said plurality of primary dilution holes is located between an adjacent pair of dilution holes of said second group of said plurality of primary dilution holes.

11. A combustor liner in accordance with claim 8 wherein:
each dilution hole of said plurality of primary dilution holes have has a diameter that is larger than a diameter of each dilution hole of said plurality of secondary dilution holes; and
said plurality of circumferentially aligned cooling holes comprises cooling holes of at least three different diameters.

12. A combustor liner in accordance with claim 8 wherein each dilution hole of said plurality of secondary dilution holes is positioned a distance from a third panel that extends downstream from said second panel, wherein the distance is approximately one half of a diameter of said plurality of secondary dilution holes.

13. A combustor liner in accordance with claim 8 wherein at least one dilution hole of said plurality of secondary dilution holes is substantially aligned with a swirler configured to discharge a fuel/air mixture into said annular shell.

14. A combustor liner in accordance with claim 8 wherein said plurality of primary dilution holes and said plurality of secondary dilution holes facilitate reducing $NO_x$ emissions in a gas turbine engine.

15. A gas turbine engine comprising:
a compressor; and a combustor comprising a combustor liner comprising:
   an annular shell comprising a plurality of overlapping circumferentially-extending panels, wherein said plurality of circumferentially-extending panels comprises a first panel positioned at an upstream end of said annular shell and a second panel positioned downstream from, and adjacent to, said first panel, a downstream portion of the first panel overlaps an upstream portion of the second panel;
   a plurality of primary dilution holes formed in said first panel; and
   a plurality of secondary dilution holes formed in said second panel wherein said plurality of primary dilution holes and said plurality of secondary dilution holes are configured to channel dilution air from said compressor into said combustor; and
   a plurality of circumferentially aligned cooling holes formed in at least one of said first panel and said second panel, wherein said plurality of circumferentially aligned cooling holes comprises a first group of cooling holes having a first size, a second group of cooling holes having a second size different than the first size, and a third group of cooling holes having a third size different than the first size and the second size.

16. A gas turbine engine in accordance with claim 15 wherein said plurality of secondary dilution holes is positioned a distance from said plurality of primary dilution holes, the distance within a range of twice a diameter of said plurality of secondary dilution holes to four times the diameter of said plurality of secondary dilution holes.

17. A gas turbine engine in accordance with claim 15 wherein said plurality of primary dilution holes comprises a first group of said plurality of primary dilution holes and a second group of said plurality of primary dilution holes, each dilution hole of said first group of said plurality of primary dilution holes has a diameter that is larger than a diameter of each dilution hole of said second group of said plurality of primary dilution holes, wherein each dilution hole of said first group of said plurality of primary dilution holes is located between an adjacent pair of dilution holes of said second group of said plurality of primary dilution holes.

18. A gas turbine engine in accordance with claim 15 wherein:
   each dilution hole of said plurality of primary dilution holes has a diameter that is larger than a diameter of each dilution hole of said plurality of secondary dilution holes; and
   said plurality of circumferentially aligned cooling holes comprises cooling holes of at least three different diameters.

19. A gas turbine engine in accordance with claim 15 wherein each dilution hole of said plurality of secondary dilution holes is positioned a distance from a third panel that extends downstream from said second panel, wherein the distance is approximately one half of a diameter of said plurality of secondary dilution holes.

20. A gas turbine engine in accordance with claim 15 wherein at least one dilution hole of said plurality of secondary dilution holes is substantially aligned with a swirler configured to discharge a fuel/air mixture into said annular shell.

* * * * *